United States Patent
Chen (10) Patent No.: US 11,206,566 B2
(45) Date of Patent: Dec. 21, 2021

(54) METHOD FOR DOWNLINK SIGNAL TRANSMISSION, TERMINAL DEVICE AND NETWORK DEVICE

(71) Applicant: GUANGDONG OPPO MOBILE TELECOMMUNICATIONS CORP., LTD., Guangdong (CN)

(72) Inventor: Wenhong Chen, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 25 days.

(21) Appl. No.: 16/627,510

(22) PCT Filed: Aug. 9, 2017

(86) PCT No.: PCT/CN2017/096661
§ 371 (c)(1),
(2) Date: Dec. 30, 2019

(87) PCT Pub. No.: WO2019/028704
PCT Pub. Date: Feb. 14, 2019

(65) Prior Publication Data
US 2020/0154297 A1    May 14, 2020

(51) Int. Cl.
*H04W 24/10* (2009.01)
*H04L 1/00* (2006.01)
(Continued)

(52) U.S. Cl.
CPC ........... *H04W 24/10* (2013.01); *H04L 1/0026* (2013.01); *H04L 5/0051* (2013.01);
(Continued)

(58) Field of Classification Search
CPC ............... H04W 24/10; H04W 72/005; H04W 72/0413; H04W 72/046; H04W 16/28;
(Continued)

(56) References Cited

U.S. PATENT DOCUMENTS

| 9,510,339 B2 | 11/2016 | Seo |
| 2015/0156751 A1 | 6/2015 | Seo |

(Continued)

FOREIGN PATENT DOCUMENTS

| CN | 101388701 A | 3/2009 |
| CN | 102064871 A | 5/2011 |

(Continued)

OTHER PUBLICATIONS

International Search Report in the international application No. PCT/CN2017/096661, dated Apr. 26, 2018.

(Continued)

*Primary Examiner* — Brian T O Connor (57) ABSTRACT

A method for downlink signal transmission and a terminal device are provided. The method includes operations as follows. The terminal device detects a plurality of downlink signals sent by a network device. The plurality of downlink signals are sent on a same physical resources using different beams. The terminal device sends first indication information to the network device. the first indication is used to indicate at least one target downlink signal in the plurality of downlink signals, and the at least one target downlink signal includes one or more downlink signals, measurement quality of which is poorer than measurement quality of any downlink signal other than the at least one target downlink signal in the plurality of downlink signals.

15 Claims, 5 Drawing Sheets

(51) Int. Cl.
   *H04L 5/00* (2006.01)
   *H04W 72/00* (2009.01)
   *H04W 72/04* (2009.01)

(52) U.S. Cl.
   CPC ....... *H04W 72/005* (2013.01); *H04W 72/046* (2013.01); *H04W 72/0413* (2013.01)

(58) Field of Classification Search
   CPC ... H04L 1/0026; H04L 5/0051; H04B 7/0695; H04B 17/309
   See application file for complete search history.

(56) References Cited

U.S. PATENT DOCUMENTS

| | | | |
|---|---|---|---|
| 2016/0373180 A1 | 12/2016 | Guo et al. | |
| 2018/0167946 A1* | 6/2018 | Si | H04L 1/0061 |
| 2019/0037429 A1* | 1/2019 | Davydov | H04L 5/0035 |
| 2019/0044593 A1* | 2/2019 | John Wilson | H04W 72/085 |
| 2019/0053183 A1* | 2/2019 | Park | H04W 56/0005 |
| 2019/0132066 A1* | 5/2019 | Park | H04W 36/0079 |

FOREIGN PATENT DOCUMENTS

| | | |
|---|---|---|
| CN | 103716081 A | 4/2014 |
| EP | 2381474 A2 | 10/2011 |
| EP | 3488537 A1 | 5/2019 |
| WO | 2013191437 A1 | 12/2013 |

OTHER PUBLICATIONS

Ullah Inam et al: "Use of beamforming and interference mitigation techniques for relay backhaul enhancement", 2016 39th International Conference on Telecommunications and Signal Processing (TSP), IEEE, Jun. 27, 2016 (Jun. 27, 2016), pp. 127-132, XP033014692, DOI: 10.1109/TSP. 2016. 7760843 [retrieved on Nov. 28, 2016] * section III-C *.

Supplementary European Search Report in the European application No. 17921109.9, dated Mar. 11, 2020.

English translation of the Written Opinion of the International Search Authority in the international application No. PCT/CN2017/096661, dated Apr. 26, 2018.

First Office Action of the Chilean application No. 201903874, dated Feb. 18, 2021.

Office Action of the Indian application No. 201917053973, dated Mar. 3, 2021.

* cited by examiner

METHOD FOR DOWNLINK SIGNAL TRANSMISSION, TERMINAL DEVICE AND NETWORK DEVICE

TECHNICAL FIELD

The embodiments of the disclosure relate to the field of communication, and more particularly to a method for downlink signal transmission, a terminal device and a network device.

BACKGROUND

In researches on 5th-Generation (5G) mobile communication technologies, a beamforming technology is an important technology for improving coverage efficiency and spectrum efficiency. The technology is a signal preprocessing technology based on an antenna array, with which, a signal sending weight of each antenna array element is regulated to generate a directional beam. The technology may be applied to uplink signal transmission and may also be applied to downlink signal transmission.

During downlink signal transmission, a network device may send multiple downlink signals to different terminal devices with different beams, and different terminal devices may also receive downlink signals sent by the network device with different beams. If the network device sends the signals to the terminal devices on the same physical resource with different beams at the same time (that is, a multi-user multiple-input multiple output (MU-MIMO) technology is adopted), a present terminal device may not only receive the signal sent by the network device to the terminal device itself, but also receive the signals sent by the network device to the other terminal devices. Therefore, the signals to the other terminal devices may strongly interfere with the signal to the present terminal device, thereby affecting downlink signal transmission.

SUMMARY

A method for downlink signal transmission, a terminal device and a network device are provided according to the embodiments of the disclosure, which can reduce interference between terminal devices and improve a downlink transmission throughput.

In a first aspect, a method for downlink signal transmission is provided, which includes operations as follows. A terminal device detects at least one downlink signal sent by a network device. The terminal device sends first indication information to the network device. The first indication information is used to indicate a target downlink signal in the at least one downlink signal, and the target downlink signal includes one or more downlink signals in the at least one downlink signal, measurement quality of which is lower than measurement quality of any downlink signal other than the target downlink signal in the at least one downlink signal.

In the embodiments of the disclosure, the terminal device sends the first indication information for indicating that the measurement quality of the downlink signal is poor to the network device, and the network device may determine a beam or transmission resource which imposes little interference to the terminal device, so that the network device can implement scheduling for another terminal device, thereby reducing interference between the terminal devices, and improving a downlink transmission throughput.

In combination with the first aspect, in a first implementation of the first aspect, before the operation that the terminal device sends the first indication information to the network device, the method may further includes an operation as follows. The terminal device measures each downlink signal in the at least one downlink signal, and determine the measurement quality of each downlink signal in the at least one downlink signal.

In combination with the first aspect or the first implementation of the first aspect, in a second implementation of the first aspect, the method may further include an operation as follows. The terminal device sends the measurement quality of the target downlink signal to the network device.

In the embodiments of the disclosure, the terminal device sends the measurement quality of the target downlink signal to the network device, and the network device may schedule the other terminal device accurately, thereby improving the downlink transmission throughput.

In combination with the first aspect or any one of the first and second implementations of the first aspect, in a third implementation of the first aspect, the target downlink signal which includes the one or more downlink signals of the at least one downlink signal, measurement quality of which is lower than measurement quality of any downlink signal other than the target downlink signal in the at least one downlink signal may include: a first downlink signal in the at least one downlink signal. The first downlink signal is a downlink signal that is not detected by the terminal device on a transmission resource for the first downlink signal.

In combination with the first aspect or any one of the first implementation to the third implementation of the first aspect, in a fourth implementation of the first aspect, the measurement quality may include at least one of a detection result, reference signal receiving power (RSRP), reference signal receiving quality (RSRQ), a signal path loss value or channel quality indicator (CQI) of the downlink signal.

In combination with the first aspect or any one of the first implementation to the fourth implementation of the first aspect, in a fifth implementation of the first aspect, the operation that the terminal device sends the first indication information to the network device may include an operation as follows. The terminal device sends a first uplink signal to the network device. The first uplink signal carries the first indication information, and the first uplink signal is an uplink signal corresponding to the target downlink signal. Each downlink signal in the at least one downlink signal has a correspondence with an uplink signal.

In combination with the first aspect or any one of the first implementation to the fifth implementation of the first aspect, in a sixth implementation of the first aspect, each downlink signal in the at least one downlink signal having the correspondence with an uplink signal may include the following.

A transmission resource for each downlink signal in the at least one downlink signal has a correspondence with a transmission resource for the uplink signal corresponding to the downlink signal, or, each downlink signal in the at least one downlink signal has a correspondence with a sequence used in the uplink signal corresponding to the downlink signal.

In combination with the first aspect or any one of the first implementation to the sixth implementation of the first aspect, in a seventh implementation of the first aspect, the operation that the terminal device sends the first indication information to the network device may include an operation. The terminal device sends uplink control information (UCI) to the network device through a physical uplink control channel (PUCCH) or a physical uplink shared channel (PUSCH). The UCI carries the first indication information.

In combination with the first aspect or any one of the first implementation to the seventh implementation of the first aspect, in an eighth implementation of the first aspect, if the at least one downlink signal includes multiple downlink signals, the at least one downlink signal may include downlink signals sent by the network device using different beams, and/or, downlink signals received by the terminal device using different beams.

In combination with the first aspect or any one of the first implementation to the eighth implementation of the first aspect, in a ninth implementation of the first aspect, the downlink signal may be a channel state information reference signal (CSI-RS), a synchronization signal (SS) or a physical broadcast channel (PBCH).

In combination with the first aspect or any one of the first implementation to ninth implementation of the first aspect, in a tenth implementation of the first aspect, the operation that the terminal device detects the at least one downlink signal sent by the network device may include an operation as follows. The terminal device detects the CSI-RS on at least one CSI-RS resource, or, the terminal device detects the SS in at least one synchronization signal block, or, the terminal device detects the PBCH in the at least one synchronization signal block.

In s second aspect, a method for downlink signal transmission is provided, which may include operations as follows. A network device sends at least one downlink signal to a first terminal device. The network device receives first indication information sent by the first terminal device. The first indication information is used to indicate a target downlink signal in the at least one downlink signal, and the target downlink signal includes one or more downlink signals of the at least one downlink signal, measurement quality of which is lower than measurement quality of any downlink signal other than the target downlink signal in the at least one downlink signal. The network device performs downlink scheduling on a second terminal device according to the first indication information.

In the embodiments of the disclosure, the network device may determine a beam or transmission resource which imposes little interference to the first terminal device according to the first indication information which is sent by the first terminal device and used to indicate the downlink signal, measurement quality of which is poor, in the at least one downlink signal, to implement scheduling for another terminal device (the second terminal device), thereby interference between the terminal devices, and improving a downlink transmission throughput.

In combination with the second aspect, in a first implementation of the second aspect, the operation that the network device performs downlink scheduling on the second terminal device according to the first indication information may include operations as follows. The network device determines, according to the first indication information, the second terminal device which performs data transmission on the same physical resource as the first terminal device; and/or, the network device determines, according to the first indication information, a beam used for data transmission of the second terminal device which performs the data transmission on the same physical resource as the first terminal device.

In combination with the second aspect or the first implementation of the second aspect, in a second implementation of the second aspect, the method may further include an operation as follows. The network device receives the measurement quality of the target downlink signal from the first terminal device.

In combination with the second aspect or any one of the first implementation and second implementation of the second aspect, in a third implementation of the second aspect, the measurement quality may include at least one of a detection result, reference signal receiving power (RSRP), reference signal receiving quality (RSRQ), a signal path loss value and a channel quality indicator (CQI) of the downlink signal.

In combination with the second aspect or any one of the first implementation to third implementation of the second aspect, in a fourth implementation of the second aspect, if the at least one downlink signal includes multiple downlink signals, the at least one downlink signal may include downlink signals sent by the network device using different beams.

In combination with the second aspect or any one of the first implementation to the fourth implementation of the second aspect, in a fifth implementation of the second aspect, the downlink signal may be a channel state information reference signal (CSI-RS), a synchronization signal (SS) or a physical broadcast channel (PBCH).

In a third aspect, a terminal device is provided, which includes one or more modules configured to execute each method embodiment in the first aspect.

In a fourth aspect, a network device is provided, which includes one or more modules configured to execute each method embodiment in the second aspect.

In a fifth aspect, a terminal device is provided, which includes a memory and a processor. The memory is configured to store a program code, and the processor is configured to call the program code to implement the above method in the first aspect and each implementation of the first aspect.

In a sixth aspect, a network device is provided, which includes a memory and a processor. The memory is configured to store a program code, and the processor is configured to call the program code to implement the above method in the second aspect and each implementation of the second aspect.

In a seventh aspect, a computer-readable medium is provided, which stores a program code executable by a terminal device, the program code includes an instruction configured to execute the above method in the first aspect and each implementation of the first aspect.

In an eighth aspect, a computer-readable medium is provided, which stores a program code executable by a network device, the program code includes an instruction configured to execute the above method in the second aspect and each implementation of the second aspect.

In a ninth aspect, a system chip is provided, which includes an input and output interface, at least one processor, at least one memory and a bus. The at least one memory is configured to store a code. The at least one processor is configured to call the code in the at least one memory to execute the operations in the above method of each aspect.

DETAILED DESCRIPTION

The technical solutions of the embodiments of the disclosure will be introduced below in combination with the drawings.

The technical solutions of the embodiments of the disclosure may be applied to various communication systems, for example, a global system of mobile communication (GSM), a code division multiple access (CDMA) system, a wideband code division multiple access (WCDMA) system, a general packet radio service (CPRS), a long term evolution (LTE) system, an LTE frequency division duplex (FDD) system, LTE time division duplex (TDD), a universal mobile telecommunication system (UNITS), a worldwide interoperability for microwave access (WiMAX) communication system or a 5G system (which may also be called a new radio (NR) system).

Figure 1:
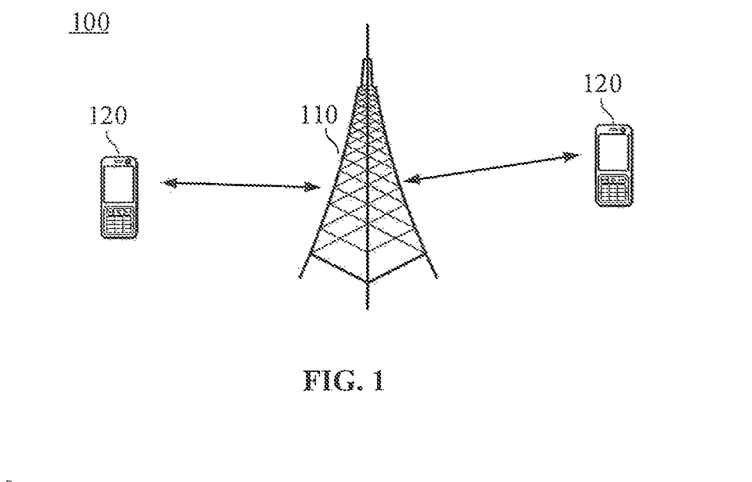
FIG. 1 is a schematic framework diagram of a wireless communication system according to an embodiment of the disclosure.

FIG. 1 illustrates a wireless communication system 100 according to an embodiment of the disclosure. The wireless communication system 100 may include a network device 110. The network device 110 may be a device communicating with a terminal device. The network device 110 may provide communication in a specific geographical region and may communicate with a terminal device located in the coverage region. Optionally, the network device 110 may be a base transceiver station (BTS) in the GSM system or the CDMA system, or may also be a NodeB (NB) in the WCDMA system, or may also be an evolutional node B (eNB or eNodeB) in the LTE system or a wireless controller in a cloud radio access network (CRAN). Alternatively, the network device may be a relay station, an access point, a vehicle-mounted device, a wearable device, a network-side device in a 5G network, a network device in a future evolved public land mobile network (PLMN) or the like.

The wireless communication system 100 further includes at least one terminal device 120 within the coverage of the network device 110. The terminal device 120 may be mobile or fixed. Optionally, the terminal device 120 may refer to an access terminal, User Equipment (UE), a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a session initiation protocol (SIP) phone, a wireless local loop (WLL) station, a personal digital assistant (PDA), handheld device having a wireless communication function, a computing device, another processing device connected to a wireless modem, a vehicle-mounted device, a wearable device, a terminal device in the 5G network, a terminal device in the future evolved PLMN or the like.

Optionally, the terminal device 120 may perform device to device (D2D) communication.

Optionally, the 5G system or network may also be called a new radio (NR) system or network.

According to the wireless communication system 100 shown in FIG. 1, the wireless communication system 100 includes one network device and two terminal devices. Optionally, the wireless communication system 100 may include multiple network devices, and the number of terminal devices in the coverage of the network device may be different from two, which is not limited in the embodiments of the disclosure.

Figure 2:
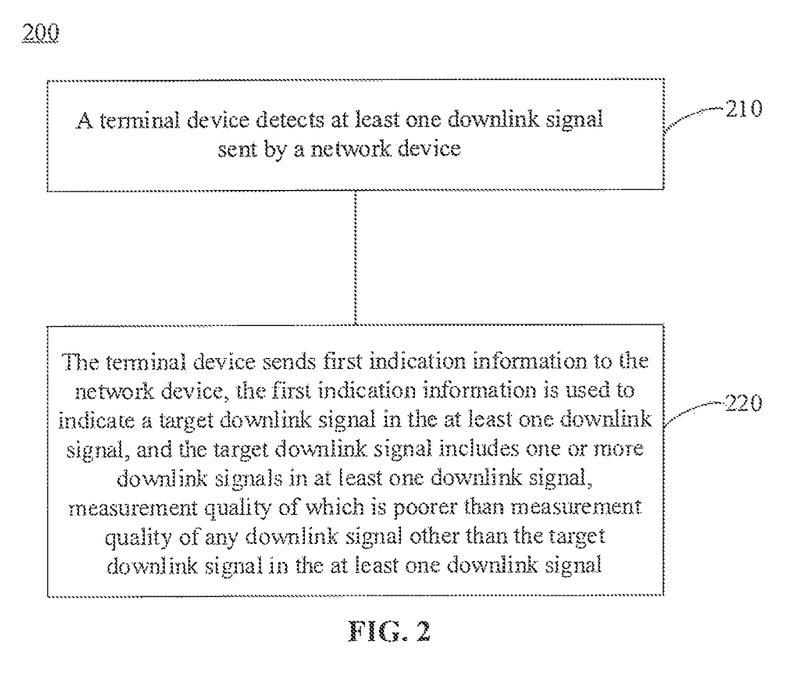
FIG. 2 is a schematic flowchart of a method for downlink signal transmission according to an embodiment of the disclosure.

FIG. 2 is a schematic block diagram of a method 200 for downlink signal transmission according to an embodiment of the disclosure. As shown in FIG. 2, the method 200 includes a part or all of the following operations.

In 210, a terminal device detects at least one downlink signal sent by a network device.

In 220, e terminal device sends first indication information to the network device. The first indication information is used to indicate a target downlink signal in the at least one downlink signal, and the target downlink signal includes one or more downlink signals of the at least one downlink signal, measurement quality of which is poorer than measurement quality of any downlink signal other than the target downlink signal in the at least one downlink signal.

In the embodiment of the disclosure, the terminal device sends the first indication information for indicating that the quality of the downlink signal is poor to the network device, and the network device may determine a beam or transmission resource occupied by a signal which imposes little interference to the signal of the terminal device, so that the network device implements downlink scheduling for another terminal device, thereby reducing interference between the terminal devices, and improving a downlink transmission throughput.

Optionally, each downlink signal in the at least one downlink signal may be a channel state information reference signal (CSI-RS), or may also be a synchronization signal (SS), or may also be a physical broadcast channel (PBCH) or other downlink signal, which is not limited in the embodiment of the disclosure.

Optionally, the terminal device may detect the CSI-RS on at least one CSI-RS resource, or the terminal device may also detect the SS or the PBCH in at least one synchronization signal block.

It is to be understood that the at least one CSI-RS resource or the at least one synchronization signal block may be pre-configured by the network device.

It is to be understood that "one" in the at least one downlink signal mentioned in the embodiment of the disclosure may refer to one bit, or one sequence, and may also refer to one downlink transmission corresponding to a data transmission block, which is not limited in the embodiment of the disclosure.

Optionally, when multiple downlink signals are detected by the terminal device, the multiple downlink signals may be downlink signals sent by the network device using different beams and/or downlink signals received by the terminal device using different beams.

Optionally, in the embodiment of the disclosure, the target downlink signal, which includes one or more downlink signals of the at least one downlink signal, measurement quality of which is poorer than measurement quality of any downlink signal other than the target downlink signal in the at least one downlink signal may be understood as multiple downlink signals, the measurement quality of which are poorest in the at least one downlink signal sent by the network device, and may also be understood as one or more downlink signals, the measurement quality of which is less than a certain threshold value, or a set of some downlink signals, the measurement quality of which is poor in the at least one downlink signal.

Optionally, when multiple downlink signals, the measurement quality of which is poorer than the measurement quality of the other downlink signals, are determined, the terminal device may select a target number of downlink signals from the multiple downlink signals according to the number of the target downlink signal configured or predetermined by the network device.

Optionally, the number of the target downlink signals may also be determined by the terminal device according to a detection result.

For example, the terminal device detects five downlink signals, in which, measurement quality of the third downlink signal is poorer than measurement quality of the other four downlink signals. Then, the terminal device may determine the third downlink signal as a target downlink signal.

For example, the terminal device detects five downlink signals, in which, measurement quality of each of the second downlink signal and the third downlink signal is less than a preset threshold value. Then, the terminal device determines both the second downlink signal and the third downlink signal as target downlink signals. in such case, the number of the target downlink signals may be determined according to the preset threshold value. Alternatively, when there are multiple downlink signals, measurement quality of each of which is less than the preset threshold value, the terminal device may select the corresponding number of signals from the determined downlink signals according to the number of the target downlink signals configured by the network device. A selection manner may be a manner of randomly selecting the corresponding number of signals, or may also be a manner of ranking the measurement quality of the determined multiple downlink signals and selecting the corresponding number of signals, measurement quality of which are poor.

For example, the terminal device detects five downlink signals, and measures all of the downlink signals, and obtains the following descending order of the downlink signals according to measurement quality: the first downlink signal, the fourth downlink signal, the second downlink signal, the third downlink signal and the fifth downlink signal. The number of the target downlink signals configured by the network device for the terminal device is two. Then, the terminal device may determine the third downlink signal and the fifth downlink signal as the target downlink signals.

Optionally, the target downlink signal, which includes one or more downlink signals of the at least one downlink signal, measurement quality of which is poorer than measurement quality of any downlink signal other than the target downlink signal in the at least one downlink signal may also be understood as the target downlink signal obtained by the following. For each downlink signal in the at least one downlink signal, the terminal device detects the downlink signal on the transmission resource of the downlink signal. If the downlink signal is not detected on a transmission resource corresponding to the downlink signal, it may be indicated that the measurement quality of the downlink signal is poorer than the measurement quality of the downlink signals other than the downlink signal such that the terminal device may not detect the downlink signal. In such case, the downlink signal that is not detected on the transmission resource may be determined as a target downlink signal.

Optionally, when there are multiple downlink signals that are not detected by the terminal device, a set of the multiple downlink signals that are not detected may be determined as a target downlink signal.

Optionally, when there are multiple downlink signals that are not detected by the terminal device, but the number of the target downlink signal configured by the network device is one, the terminal device may randomly select one downlink signal from the multiple downlink signals that are not detected as a target downlink signal.

For example, the network device notifies the terminal device of transmission resources for five downlink signals, and the terminal device performs signal detection on these transmission resources but only detects three downlink signals. Then, the terminal device may determine the two downlink signals that are not detected as target downlink signals.

Optionally, when the terminal device sends the first indication information for indicating the target downlink signal to the network device, the terminal device may further send the measurement quality of the target downlink signal to the terminal device.

It is to be understood that the terminal device sends the measurement quality of the target downlink signal to the network device, so that the network device may determine accurately how to perform downlink scheduling on the other terminal device than the present terminal device.

For example, the first indication information sent by the terminal device to the network device indicates that interference of the first downlink signal and third downlink signal in the five downlink signals sent by the network device to the terminal device onto the signal of the present terminal device is relatively little (that is, the measurement quality of the first downlink signal and the third downlink signal is the poorest). In such case, the network device, when configuring a beam for sending a downlink signal for a second terminal device (different from the present terminal device), may configure any one of a beam for sending the first downlink signal or a beam for sending the third downlink signal for the second terminal device. For example, the network device configures the beam for sending the third downlink signal for the second terminal device. The measurement quality of the first downlink signal is poorer than the measurement quality of the third downlink signal, that is, the interference of the beam for sending the first downlink signal onto the present terminal device is minimum. In such case, if the terminal device also sends the measurement quality of each target downlink signal to the network device, the network device may make a better configuration for the other terminal device according to the measurement quality of the target downlink signal, thereby, further reducing the interference between the terminal devices, and improving the downlink transmission throughput.

Optionally, a manner in which the terminal device sends the measurement quality of the target downlink signal to the network device may be a differential reporting manner, that is, the terminal device sends a difference of the measurement quality of a downlink signal relative to the measurement quality of another downlink signal to the network device. Therefore, a signaling overhead between the terminal device and the network device may be reduced, and energy consumption of the terminal device and the network device may be reduced.

Optionally, the measurement quality may be a detection result obtained by detecting the downlink signal. For example, the terminal device detects (cyclic redundancy check (CRC)) each downlink signal in the at least one downlink signal and, if the corresponding downlink signal is not detected, determines the downlink signal that is not detected as the target downlink signal. The measurement quality may also be a measurement value obtained by performing measurement on reference signal receiving power (RSRP) of the downlink signal by the terminal device, may also be a measured value obtained by performing measurement on reference signal receiving quality (RSRQ) of the downlink signal by the terminal device, or may also be a channel quality indicator (CQI) of each downlink signal estimated by the terminal device based on the downlink signal, or may also be a path loss value of each downlink signal estimated by the terminal device based on the downlink signal, or another parameter capable of reflecting the quality of the downlink signal, which is not limited in the embodiment of the disclosure.

It is to be understood that, when the measurement quality is the RSRP, the RSRQ and the CQI, the measurement quality of the target downlink signal being poor represents the measurement value of each target downlink signal being minimum or lower than a certain preset threshold. When the measurement quality is the path loss value, the measurement quality of the target downlink signal being poor represents that the measurement value of each target downlink signal being maximum or higher than a certain threshold value.

Optionally, before the terminal device sends the first indication information to the network device, the terminal device may farther measure each downlink signal in the at least one downlink signal, to determine the measurement quality of each downlink signal in the at least one downlink signal.

Optionally, the operation that the terminal device sends the first indication information to the network device may include an operation as follows. The terminal device sends a first uplink signal to the network device. The first uplink signal carries the first indication information, and the first uplink signal is an uplink signal corresponding to the target downlink signal.

Optionally, each downlink signal in the at least one downlink signal has a correspondence with an uplink signal, and the correspondence may be a correspondence between a transmission resource for each downlink signal in the at least one downlink signal and a transmission resource for the uplink signal corresponding to the downlink signal, or a correspondence between each downlink signal in the at least one downlink signal and a sequence used in the uplink signal corresponding to the downlink signal, or another relation capable of representing a correspondence between the downlink signal and the uplink signal.

For example, each CSI-RS transmission resource for transmitting a CSI-RS may correspond to a transmission resource for an uplink signal, and different CSI-RS transmission resources correspond to transmission resources for different uplink signals. Therefore, the terminal device, when sending the first indication information to the network device, may send an uplink signal on the transmission resource for the uplink signal corresponding to the target downlink signal. If an uplink signal is detected by the network device on the transmission resource for the uplink signal, it is indicated that the CSI-RS transmitted on the CSI-RS transmission resource corresponding to the transmission resource for the uplink signal is the target downlink signal.

For example, each downlink signal in the at least one downlink signal may also correspond to a sequence of an uplink pilot signal (for example, sounding reference signal (SRS)), and different downlink signals correspond to different sequences in the uplink pilot signal. Therefore, when the terminal device sends the first indication information to the network device, the terminal device may send the uplink pilot signal to the network device. If a certain sequence in the uplink pilot signal is detected by the network device, it is indicated that the downlink signal corresponding to the sequence in the uplink pilot signal is the target downlink signal.

Optionally, the terminal device may also send the first indication information to the network device through a physical uplink control channel (PUCCH) or a physical uplink shared channel (PUSCH).

Optionally, the terminal device may also send the first indication information to the network device by using an index indication method, or send the first indication information to the network device by using a bitmap method.

Optionally, whether the terminal device is to send the first indication information to the network device may be configured by the network device.

Optionally, after the network device receives the first indication information sent by the terminal device, the network device may schedule the other terminal device according to the first indication information.

Optionally, the terminal device which sends the first indication information to the network device is a first terminal device, and the network device may schedule the second terminal device according to the first indication information. The second terminal device is different from the first terminal device. The operation that the network device schedules the second terminal device according to the first indication information may be implemented as follows. The network device determines the second terminal device which performs data transmission on the same physical resource as the first terminal device according to the first indication information, and/or, the network device determines a beam for data transmission of the second terminal device which performs the data transmission on the same physical resource as the first terminal device according to the first indication information.

In such a manner, since the first indication information is used to indicate the target downlink signal, and the target downlink signal is a downlink signal (i.e., a signal which imposes little interference to the present terminal device) having poor quality, it can be seen that, if a beam where the target downlink signal is located is allocated to the other terminal device (the second terminal device), interference of the downlink signal received by the second terminal device onto the downlink signal of the present terminal device is relatively little.

In the embodiment of the disclosure, the terminal device may send the indication information of the target downlink signal to the network device, and the network device may determine a beam or transmission resource corresponding to a signal which imposes little interference onto the signal of the terminal device, to implement downlink scheduling for the other terminal device, thereby the interference between the terminal devices, and improving the downlink transmission throughput.

Figure 3:
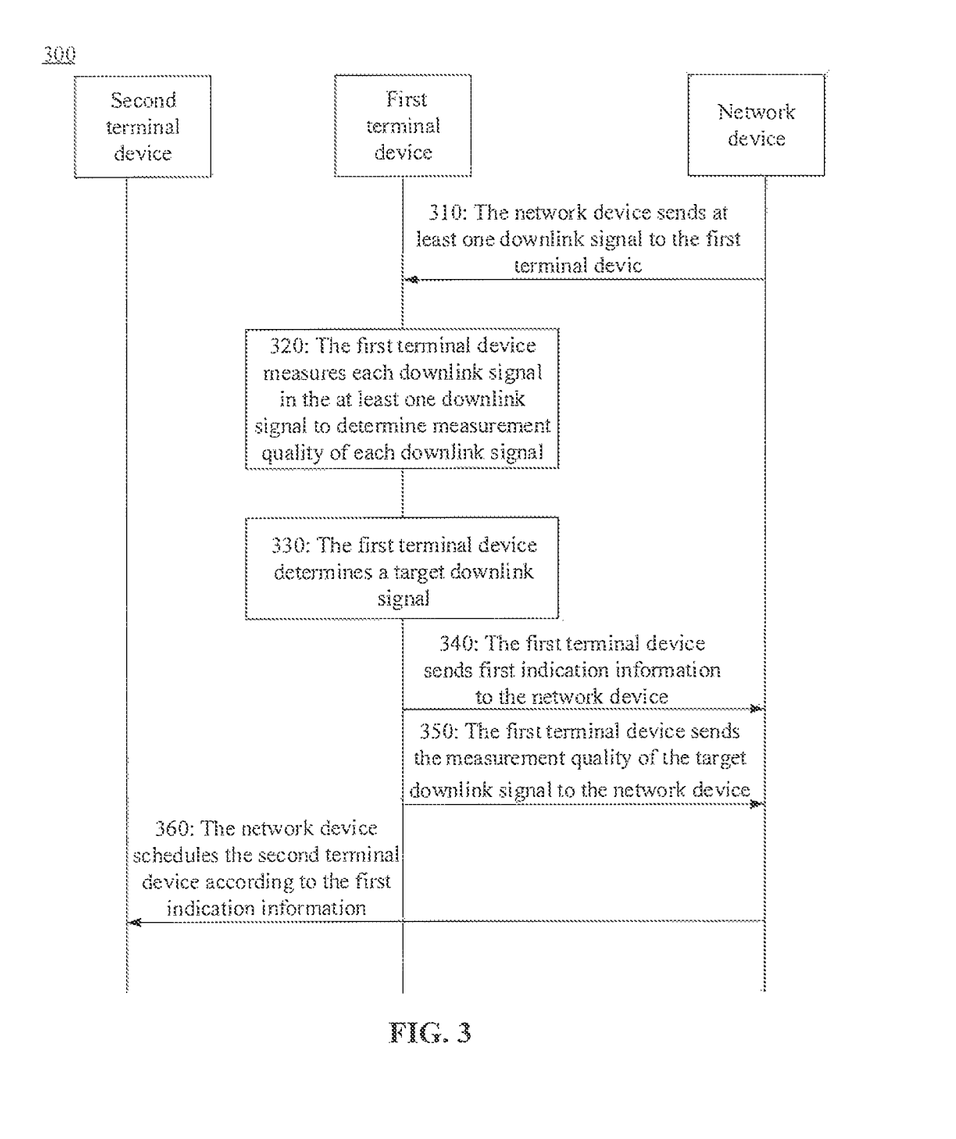
FIG. 3 is another schematic flowchart of a method for downlink signal transmission according to an embodiment of the disclosure.

FIG. 3 is a schematic flowchart of a method 300 for downlink signal transmission according to an embodiment of the disclosure. As shown in FIG. 3, the method 300 includes a part or all of the following steps.

In 310, a network device sends at least one downlink signal to a first terminal device.

Optionally, each downlink signal in the at least one downlink signal may be a CSI-RS, or may also be an SS, or may also be a PBCH or another downlink signal, which is not limited in the embodiment of the disclosure.

Optionally, the terminal device may detect the CSI-RS on at least one CSI-RS resource, or the terminal device may also detect the SS or the PBCH in at least one synchronization signal block.

It is to be understood that the at least one CSI-RS resource or the at least one synchronization signal block may be pre-configured by the network device.

In 320, the first terminal device measures each downlink signal in the at least one downlink signal to determine measurement quality of the downlink signal.

Optionally, the measurement quality may be a detection result obtained by detecting the downlink signal. For example, the terminal device detects (cyclic redundancy check (CRC)) each downlink signal in the at least one downlink signal and, if the corresponding downlink signal is not detected, determines the downlink signal that is not detected as the target downlink signal. The measurement quality may also be a measurement value obtained by measurement performed by the terminal device on reference signal receiving power (RSRP) of the downlink signal, may also be a measurement value obtained by measurement performed by the terminal device on reference signal receiving quality (RSRQ) of the downlink signal, or may also be a channel quality indicator (CQI) of each downlink signal estimated by the terminal device based on the downlink signal, or may also be a path loss value of each downlink signal estimated by the terminal device based on the downlink signal, or another parameter capable of reflecting the quality of the downlink signal, which is not limited in the embodiment of the disclosure.

In 330, the first terminal device determines a target downlink signal.

In the embodiment of the disclosure, the target downlink signal includes one or more downlink signals of the at least one downlink signal, measurement quality of which is poorer than measurement quality of any downlink signal other than the target downlink signal in the at least one downlink signal.

Optionally, in the embodiment of the disclosure, the target downlink signal which includes one or more downlink signals of the at least one downlink signal, measurement quality of which is poorer than measurement quality of any downlink signal other than the target downlink signal in the at least one downlink signal may be understood as a downlink signal, the measurement quality of which are poorest in the at least one downlink signal sent by the network device, and may also be understood as one or more downlink signals, the measurement quality of which is less than a certain threshold value, or a set of some downlink signals, the measurement quality of which is poor in the at least one downlink signal.

Optionally, when multiple downlink signals, the measurement quality of which is poorer than the measurement quality of the other downlink signals, are determined, the terminal device may determine the number of target downlink signals according to the number of the target downlink signal configured by the network device.

Optionally, the number of the target downlink signals may also be determined by the terminal device according to the detection result.

Optionally, the target downlink signal, which includes one or more downlink signals of the at least one downlink signal, measurement quality of which is poorer than measurement quality of any downlink signal other than the target downlink signal in the at least one downlink signal may also be understood as the target downlink signal obtained by the following. For each downlink signal in the at least one downlink signal, the terminal device detects the downlink signal on the transmission resource of the downlink signal. If the downlink signal is not detected on a transmission resource corresponding to the downlink signal, it may be indicated that the measurement quality of the downlink signal is poorer than the measurement quality of the downlink signals other than the downlink signal such that the terminal device may not detect the downlink signal. In such case, the downlink signal that is not detected on the transmission resource may be determined as a target downlink signal.

Optionally, when there are multiple downlink signals that are not detected by the terminal device, a set of the multiple downlink signals that are not detected may be determined as a target downlink signal.

Optionally, when there are multiple downlink signals that are not detected by the terminal device, but the number of the target downlink signal configured by the network device is one, the terminal device may randomly select one downlink signal from the multiple downlink signals that are not detected as a target downlink signal.

In 340, the first terminal device sends first indication information to the network device. The first indication information is used to indicate the target downlink signal in the at least one downlink signal.

Optionally, the operation that the terminal device sends the first indication information to the network device may include an operation as follows. The terminal device sends a first uplink signal to the network device. The first uplink signal carries the first indication information, and the first uplink signal is an uplink signal corresponding to the target downlink signal.

Optionally, each downlink signal in the at least one downlink signal has a correspondence with an uplink signal, and the correspondence may be a correspondence between a transmission resource for each downlink signal in the at least one downlink signal and a transmission resource for the uplink signal corresponding to the downlink signal, or a correspondence between each downlink signal in the at least one downlink signal and a sequence for the uplink signal corresponding to the downlink signal, or another relation capable of representing a correspondence between the downlink signal and the uplink signal.

Optionally, the terminal device may also send the first indication information to the network device through a PUCCH or a PUSCH.

Optionally, the terminal device may also send the first indication information to the network device by using an index indication method, or send the first indication information to the network device by using a bitmap method.

Optionally, whether the terminal device is to send the first indication information to the network device may be configured by the network device.

In 350, the first terminal device sends measurement quality of the target downlink signal to the network device.

It is to be understood that the terminal device sends the measurement quality of the target downlink signal to the network device, so that the network device may accurately determine how to perform downlink scheduling on the other terminal device except the present terminal device.

Optionally, a manner in which the terminal device sends the measurement quality of the target downlink signal to the network device may be a differential reporting manner, that is, the terminal device sends a difference of the measurement quality of a downlink signal relative to the measurement quality of another downlink signal to the network device. Therefore, a signaling overhead between the terminal device and the network device may be reduced, and energy consumption of the terminal device and the network device may be reduced.

It is to be understood that the operation in 350 is an optional operation, that is, the method 300 may include the operation in 350 and may also not include the operation in 350, and the method is not limited by the operation in 350.

In 360, the network device schedules a second terminal device according to the first indication information.

Optionally, the operation that the network device schedules the second terminal device according to the first indication information may be implemented as operations as follows. The network device determines the second terminal device which performs data transmission on the same physical resource as the first terminal device according to the first indication information, and/or, the network device determines a beam for data transmission of the second terminal device which performs the data transmission on the same physical resource as the first terminal device according to the first indication information.

Optionally, the network device may also schedule the second terminal device according to the measurement quality of the target downlink signal sent by the first terminal device.

It is to be understood that the number of second terminal devices may be more than one and the second terminal device is different from the first terminal device.

In the embodiment of the disclosure, the first terminal device may send the indication information of the target downlink signal to the network device, and the network device may determine a beam or transmission resource where the signal with little interference onto the signal of the first terminal device is located, to implement downlink scheduling for the second terminal device, thereby reducing the interference between the terminal devices, and improving the downlink transmission throughput.

The method embodiments of the disclosure are described above in combination with FIG. 2 and FIG. 3 in detail, and a terminal device embodiment and network device embodiment of the embodiments of the disclosure will be described below in combination with FIG. 4 to FIG. 8 in detail. It is to be understood that the terminal device embodiment and the network device embodiment correspond to the method embodiments respectively, and for similar descriptions, reference may be made to the method embodiments.

Figure 4:
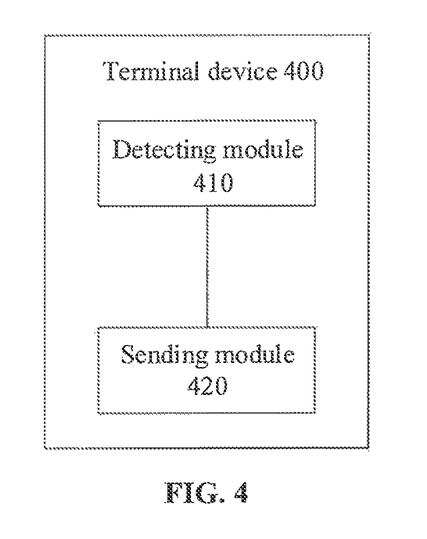
FIG. 4 is a schematic block diagram of a terminal device according to an embodiment of the disclosure.

FIG. 4 is a schematic block diagram of a terminal device 400 according to an embodiment of the disclosure. As shown in FIG. 4, the terminal device 400 includes a part or all of a detecting module 410 and a sending module 420.

The detecting module 410 is configured to detect at least one downlink signal sent by a network device.

The sending module 420 is configured to send first indication information to the network device. The first indication information is used to indicate a target downlink signal in the at least one downlink signal, and the target downlink signal includes one or more downlink signals in the at least one downlink signal, measurement quality of which is poorer than measurement quality of any downlink signal other than the target downlink signal in the at least one downlink signal.

In the embodiment of the disclosure, the terminal device 400 sends to the network device, the first indication information for indicating the downlink signal, the measurement quality of which is poor. The network device may determine a beam or transmission resource which imposes little interference onto the terminal device 400, so that the network device implements scheduling for another terminal device, thereby reducing interference between the terminal devices, and improving a downlink transmission throughput Optionally, each downlink signal in the at least one downlink signal may be a channel state information reference signal (CSI-RS), or may also be a synchronization signal (SS), or may also be a physical broadcast channel (PBCH) or other downlink signal, which is not limited in the embodiment of the disclosure.

Optionally, the detecting module 410 may be configured to detect the CSI-RS on at least one CSI-RS resource.

Optionally, the detecting module 41 may further be configured to detect the SS in at least one synchronization signal block.

Optionally, the detecting module 410 may further be configured to detect the PBCH in the at least one synchronization signal block.

It is to be understood that the at least one CSI-RS resource or the at least one synchronization signal block may be pre-configured by the network device.

It is to be understood that "one" in the at least one downlink signal mentioned in the embodiment of the disclosure may refer to one hit, or one sequence, and may also refer to one downlink transmission corresponding to a data transmission block, which is not limited in the embodiment of the disclosure.

Figure 5:
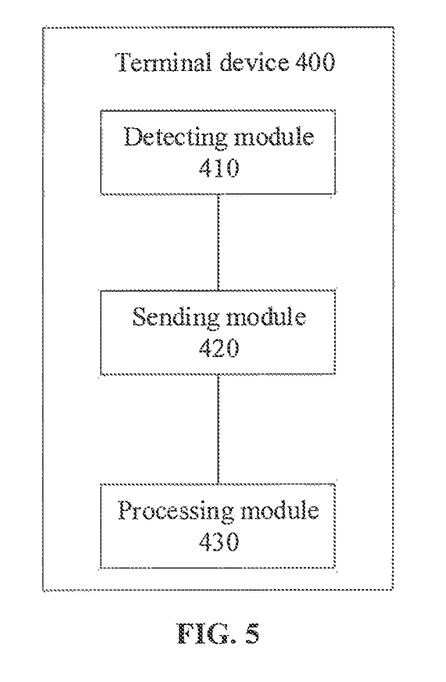
FIG. 5 is another schematic block diagram of a terminal device according to an embodiment of the disclosure.

Optionally, as shown in FIG. 5, the terminal device 400 further includes a processing module 430. The processing module 430 is configured to measure each downlink signal in the at least one downlink signal, to determine the measurement quality of each downlink signal in the at least one downlink signal.

Optionally, the sending module 420 is further configured to send the measurement quality of the target downlink signal to the network device.

Optionally, in the embodiment of the disclosure, the target downlink signal, which includes one or more downlink signals of the at least one downlink signal, measurement quality of which is poorer than measurement quality of any downlink signal other than the target downlink signal in the at least one downlink signal may be understood as multiple downlink signals, the measurement quality of which are poorest in the at least one downlink signal sent by the network device, and may also he understood as one or more downlink signals, the measurement quality of which is less than a certain threshold value, or a set of some downlink signals, the measurement quality of which is poor in the at least one downlink signal.

Optionally, when multiple downlink signals, the measurement quality of which is poorer than the measurement quality of the other downlink signals, are determined, the terminal device may select a target number of downlink signals from the multiple downlink signals according to the number of the target downlink signal configured or predetermined by the network device.

Optionally, the number of the target downlink signals may also be determined by the terminal device 400 according to a detection result.

Optionally, the target downlink signal, which includes one or more downlink signals of the at least one downlink signal, measurement quality of which is poorer than measurement quality of any downlink signal other than the target downlink signal in the at least one downlink signal may also be understood as the target downlink signal obtained by the following. For each downlink signal in the at least one downlink signal, the terminal device detects the downlink signal on the transmission resource of the downlink signal. If the downlink signal is not detected on a transmission resource corresponding to the downlink signal, it may be indicated that the measurement quality of the downlink signal is poorer than the measurement quality of the downlink signals other than the downlink signal such that the terminal device may not detect the downlink signal. In such case, the downlink signal that is not detected on the transmission resource may be determined as a target downlink signal.

Optionally, when there are multiple downlink signals that are not detected by the terminal device 400, a set of the multiple downlink signals that are not detected may be determined as a target downlink signal.

Optionally, when there are multiple downlink signals that are not detected by the terminal device 400, but the number of the target downlink signal configured by the network device is one, the terminal device may randomly select one downlink signal from the multiple downlink signals that are not detected as a target downlink signal.

Optionally, the measurement quality may be a detection result obtained by detecting the downlink signal. For example, the terminal device detects (cyclic redundancy check (CRC)) each downlink signal in the at least one downlink signal and, if the corresponding downlink signal is not detected, determines the downlink signal that is not detected as the target downlink signal. The measurement quality may also be a measurement value obtained by performing measurement on RSRP of the downlink signal by the terminal device, may also be a measurement value obtained by performing measurement on RSRQ of the downlink signal by the terminal device, or may also be a CQI of each downlink signal estimated by the terminal device based on the downlink signal, or may also be a path loss value of each downlink signal estimated by the terminal device based on the downlink signal, or another parameter capable of reflecting the quality of the downlink signal, which is not limited in the embodiment of the disclosure.

Optionally, the sending module 420 is further configured to send a first uplink signal to the network device. The first uplink signal carries the first indication information, and the first uplink signal is an uplink signal corresponding to the target downlink signal.

Optionally, each downlink signal in the at least one downlink signal has a correspondence with an uplink signal, and the correspondence may be a correspondence between a transmission resource for each downlink signal in the at least one downlink signal and a transmission resource for the uplink signal corresponding to the downlink signal, or a correspondence between each downlink signal in the at least one downlink signal and a sequence for the uplink signal corresponding to the downlink signal, or another relation capable of representing a correspondence between the downlink signal and the uplink signal.

Optionally, if the at least one downlink signal includes multiple downlink signals, the at least one downlink signal is downlink signals sent by the network device using different beams.

Optionally, if the at least one downlink signal includes multiple downlink signals, the at least one downlink signal is downlink signals received by the terminal device using different beams.

Optionally, the sending module 420 may also send the first indication information to the network device through a PUCCH or a PUSCH.

Optionally, the sending module 420 may also send the first indication information to the network device by using an index indication method or send the first indication information to the network device by using a bitmap method.

Optionally, whether the sending module 420 is to send the first indication information to the network device may be configured by the network device.

It is to be understood that the terminal device 400 in the embodiment of the disclosure may correspond to the terminal device in the method embodiments, and the abovementioned and other operations and/or functions of each module in the terminal device 400 implement the corresponding flows of each method in FIG. 2 and FIG. 3 respectively, which is not elaborated herein for simplicity.

Figure 6:
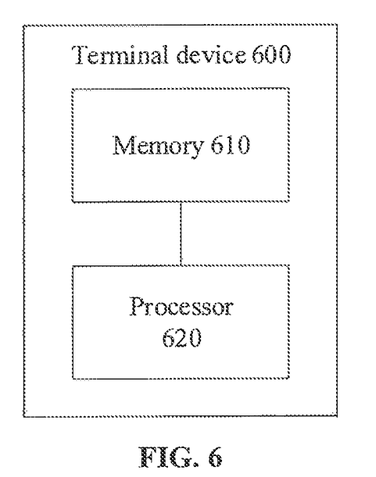
FIG. 6 is another schematic block diagram of a terminal device according to an embodiment of the disclosure.

FIG. 6 is a schematic structure diagram of a terminal device 600 according to an embodiment of the disclosure. As shown in FIG. 6, the terminal device 600 includes a memory 610 and a processor 620. The memory 610 communicates with the processor 620 through an internal connection path, to perform transmission of control and/or data signals.

The memory 610 is configured to store a program code.

The processor 620 is configured to call the program code to implement the method in each embodiment of the disclosure.

In the embodiment of the disclosure, the processor 620 may be a central processing unit (CPU), a network processor (NP) or a combination of the CPU or the NP. The processor may further include a hardware chip. The above hardware chip may be an application-specific integrated circuit (ASIC), a programmable logic device (PLD) or a combination thereof.

A computer-readable medium is provided in an embodiment of the disclosure, which is configured to store a computer program code. The computer program includes an instruction configured to execute the methods for downlink signal transmission of the embodiments of the disclosure in FIG. 2 and FIG. 3. The readable medium may be a read-only memory (ROM) or a random access memory (RAM), which is not limited in the embodiment of the disclosure.

It is to be understood that the terminal device 600 according to the embodiment of the disclosure may correspond to the terminal device in the method embodiments, and the abovementioned and other operations and/or functions of each module in the terminal device 600 implement the corresponding flows of each method in FIG. 2 and FIG. 3 respectively, which is not be elaborated herein for simplicity.

Figure 7:
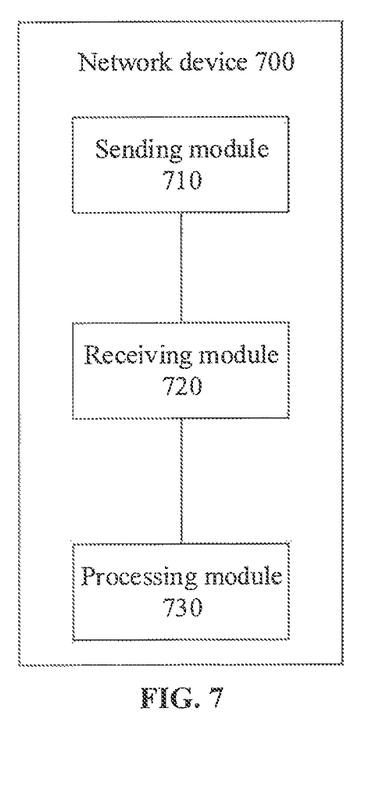
FIG. 7 is a schematic block diagram of a network device according to an embodiment of the disclosure.

FIG. 7 is a schematic block diagram of a network device 700 according to an embodiment of the disclosure. As shown in FIG. 7, the network device 700 includes part or all of a sending module 710, a receiving module 720 and a processing module 730.

A sending module 710 is configured to send at least one downlink signal to a first terminal device.

A receiving module 720 is configured to receive first indication information sent by the first terminal device. The first indication information is used to indicate a target downlink signal in the at least one downlink signal, and the target downlink signal is one or more downlink signals of the at least one downlink signal, measurement quality of which is poorer than measurement quality of any downlink signal other than the target downlink signal in the at least one downlink signal.

A processing module 730 is configured to perform downlink scheduling on a second terminal device according to the first indication information.

Optionally, each downlink signal in the at least one downlink signal may be a channel state information reference signal (CSI-RS), or may also be a synchronization signal (SS), or may also be a physical broadcast channel (PBCH) or other downlink signal, which is not limited in the embodiment of the disclosure.

It is to be understood that "one" in the at least one downlink signal mentioned in the embodiment of the disclosure may refer to one bit, or one sequence, and may also refer to one downlink transmission corresponding to a data transmission block, which is not limited in the embodiment of the disclosure.

Optionally, in the embodiment of the disclosure, the target downlink signal, which includes one or more downlink signals of the at least one downlink signal, measurement quality of which is poorer than measurement quality of any downlink signal other than the target downlink signal in the at least one downlink signal may be understood as multiple downlink signals, the measurement quality of which are poorest in the at least one downlink signal sent by the network device, and may also be understood as one or more downlink signals, the measurement quality of which is less than a certain threshold value, or a set of some downlink signals, the measurement quality of which is poor in the at least one downlink signal.

Optionally, when multiple downlink signals, the measurement quality of which is poorer than the measurement quality of the other downlink signals, are determined, the terminal device may select a target number of downlink signals from the multiple downlink signals according to the number of the target downlink signal configured or predetermined by the network device 700.

Optionally, the number of the target downlink signal may also be determined by the terminal device according to a detection result.

Optionally, the target downlink signal, which includes one or more downlink signals of the at least one downlink signal, measurement quality of which is poorer than measurement quality of any downlink signal other than the target downlink signal in the at least one downlink signal may also be understood as the target downlink signal obtained by the following. For each downlink signal in the at least one downlink signal, the terminal device detects the downlink signal on the transmission resource of the downlink signal. If the downlink signal is not detected on a transmission resource corresponding to the downlink signal, it may be indicated that the measurement quality of the downlink signal is poorer than the measurement quality of the downlink signals other than the downlink signal such that the terminal device may not detect the downlink signal. In such case, the downlink signal that is not detected on the transmission resource may be determined as a target downlink signal.

Optionally, when there are multiple downlink signals that are not detected by the terminal device, a set of the multiple downlink signals that are not detected may he determined as the target downlink signal.

Optionally, when there are multiple downlink signals that are not detected by the terminal device, but the number of the target downlink signal configured by the network device 700 is one, the terminal device may randomly select one downlink signal from the multiple downlink signals that are not detected as a target downlink signal.

Optionally, the processing module 730 is configured to determine the second terminal device which performs data transmission on the same physical resource as the first terminal device according to the first indication information.

Optionally, the processing module 730 is further configured to determine a beam used for data transmission of the second terminal device which performs the data transmission on the same physical resource as the first terminal device according to the first indication information.

Optionally, the receiving module 720 is further configured to send the measurement quality of the target downlink signal sent by the first terminal device.

Optionally, the measurement quality may be a detection result obtained by detecting the downlink signal. For example, the terminal device detects (cyclic redundancy check (CRC)) each downlink signal in the at least one downlink signal and, if the corresponding downlink signal is not detected, determines the downlink signal that is not detected as the target downlink signal. The measurement quality may also be a measurement value obtained by measurement performed by the terminal device on RSRP of the downlink signal, may also be a measured value obtained by measurement performed by the terminal device on RSRQ of the downlink signal, or may also be a CQI of each downlink signal estimated by the terminal device based on the downlink signal, or may also be a path loss value of each downlink signal estimated by the terminal device based on the downlink signal, or another parameter capable of reflecting the quality of the downlink signal, which is not limited in the embodiment of the disclosure.

Optionally, if the at least one downlink signal includes multiple downlink signals, the at least one downlink signal is downlink signals sent by the network device using different beams.

Figure 8:
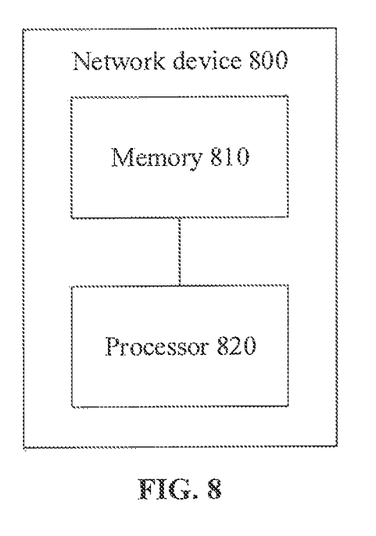
FIG. 8 is another schematic block diagram of a network device according to an embodiment of the disclosure.

FIG. 8 is a schematic structure diagram of a network device 800 according to an embodiment of the disclosure. As shown in FIG. 8, the network device 800 includes a memory 810 and a processor 820. The memory 810 communicates with the processor 820 through an internal connection path, to perform transmission of control and/or data signals.

The memory 810 is configured to store a program code.

The processor 820 is configured to call the program code to implement the method in each embodiment of the disclosure.

In the embodiment of the disclosure, the processor 820 may be a central processing unit (CPU), a network processor (NP) or a combination of the CPU or the NP. The processor may further include a hardware chip. The above hardware chip may be an application-specific integrated circuit (ASIC), a programmable logic device (PLD) or a combination thereof.

A computer-readable medium is provided according to an embodiment of the disclosure, which is configured to store a computer program code. The computer program includes an instruction configured to execute the above methods for downlink signal transmission of the embodiments of the disclosure in FIG. 2 and FIG. 3. The readable medium may be a read-only memory (ROM) or a random access memory (RAM), which is not limited in the embodiment of the disclosure.

It is to be understood that the network device 800 according to the embodiment of the disclosure may correspond to the terminal device in the method embodiments, and the abovementioned and other operations and/or functions of each module in the network device 800 implement the corresponding flows of each method in FIG. 2 and FIG. 3 respectively, which will not be elaborated herein for simplicity, A system chip is further provided according to an embodiment of the disclosure, which includes an input and output interface, at least one processor, at least one memory and a bus. The at least one memory is configured to store an instruction. The at least one processor is configured to call the instruction in the at least one memory, to execute the operations in the above method in each aspect.

It is to be understood that term "and/or" in the disclosure only represents an association relationship between associated objects, and represents that there are three relationships. For example, A and/or B may represent three conditions of only A, both A and B and only B. In addition, character "/" in the disclosure generally represents an "or" relationship between previous and next associated objects.

Those skilled in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by using different methods, however, such realization should be considered to fall within the scope of the disclosure.

Those skilled in the art may clearly learn about that regarding specific operation processes of the system, the device and the unit described above, reference may be made to the corresponding processes in the above method embodiment, which are not be elaborated herein for convenient and brief description.

In some embodiments provided by the disclosure, it should be understood that the disclosed system, device and method may be implemented in another manner. For example, the device embodiment described above is only schematic. For example, the units are divided according to logic functions, and may be divided in other division manners during practical implementation. For example, multiple units or components may be combined or integrated into another system, or some characteristics may he neglected or not executed. In addition, displayed or discussed coupling or direct coupling or communication connection may be indirect coupling or communication connection of the device or the units through some interfaces, and may be electrical and mechanical or in other forms.

The units described as separate parts may or may not be physically separated, and parts displayed as units may or may not be physical units. That is, the parts may be located in the same place, or may also be distributed to multiple network units. A part or all of the units may be selected to achieve the purpose of the solutions of the embodiments according to a practical requirement.

In addition, all functional units in each embodiment of the disclosure may be integrated into a processing unit, each unit may also physically exist independently, and two or more units may also be integrated into a unit.

The embodiments may be implemented completely or partially with software, hardware, firmware or any combination thereof in a case of being implemented with the software, the embodiments may be implemented completely or partially in form of computer program product. The computer program product includes one or more computer instructions. When the computer program instruction is loaded and executed on a computer, a part or all of the flows or functions according to the embodiments of the disclosure are generated. The computer may be a universal computer, a dedicated computer, a computer network or another programmable device. The computer instruction may be stored in a computer-readable storage medium or may be transmitted from one computer-readable, storage medium to another computer-readable storage medium. For example, the computer instruction may be transmitted from a website, computer, server or data center to another website, computer, server or data center in a wired (for example, a coaxial cable, an optical fiber and a digital subscriber line (DSL)) or wireless (for example, an infrared, wireless and microwave manner) manner. The computer-readable storage medium may be any available medium accessible for the computer or a data storage device, such as a server and a data center, including one or more integrated available media. The available medium may be a magnetic medium (for example, a floppy disk, a hard disk and a magnetic tape), an optical medium (for example, a DVD), a semiconductor medium (for example, a solid state disk (SSD)) or the like.

The forgoing is only the specific embodiments of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims,

The invention claimed is:

1. A method for downlink signal transmission, comprising:
   detecting, by a terminal device, a plurality of downlink signals sent by a network device, wherein the plurality of downlink signals are sent on a same physical resource using different beams; and
   sending, by the terminal device, first indication information to the network device, wherein the first indication information is used to indicate at least one target downlink signal in the plurality of downlink signals, and the at least one target downlink signal comprises one or more downlink signals in the plurality of downlink signals, measurement quality of which is poorer than measurement quality of any downlink signal other than the at least one target downlink signal in the plurality of downlink signals,
   wherein the method further comprises: sending, by the terminal device, the measurement quality of the at least one target downlink signal to the network device,
   wherein sending, by the terminal device, the first indication information to the network device comprises: sending, by the terminal device, a first uplink signal to the network device, the first uplink signal carrying the first indication information, the first uplink signal being an uplink signal corresponding to the at least one target downlink signal, and each downlink signal in the plurality of downlink signals having a correspondence with an uplink signal.

2. The method of claim 1, wherein the at least one target downlink signal which comprises one or more downlink signals in the plurality of downlink signals, measurement quality of which is poorer than measurement quality of any downlink signal other than the at least one target downlink signal in the plurality of downlink signals comprises:
   a first downlink signal in the plurality of downlink signals, the first downlink signal being a downlink signal that is not detected by the terminal device on a transmission resource for the first downlink signal.

3. The method of claim 1, wherein the measurement quality comprises at least one of a detection result, reference signal receiving power (RSRP), reference signal receiving quality (RSRQ), a signal path loss value or a channel quality indicator (CQI) of the downlink signal.

4. The method of claim 1, wherein each downlink signal in the plurality of downlink signals having a correspondence with an uplink signal comprises:

a transmission resource for each downlink signal in the plurality of downlink signals having a correspondence with a transmission resource for the uplink signal corresponding to the downlink signal, or each downlink signal in the plurality of downlink signals having a correspondence with a sequence used in the uplink signal corresponding to the downlink signal.

5. The method of claim 1, wherein sending, by the terminal device, the first indication information to the network device comprises:
sending, by the terminal device, uplink control information (UCI) to the network device through a physical uplink control channel (PUCCH) or a physical uplink shared channel (PUSCH), the UCI carrying the first indication information.

6. The method of claim 1, wherein if the plurality of downlink signals comprises a plurality of downlink signals, the plurality of downlink signals is at least one of: downlink signals sent by the network device using different beams, or downlink signals received by the terminal device using different beams.

7. The method of claim 1, wherein the downlink signal is a channel state information reference signal (CSI-RS), a synchronization signal (SS) or a physical broadcast channel (PBCH).

8. A method for downlink signal transmission, comprising:
sending, by a network device, a plurality of downlink signals to a first terminal device, wherein the plurality of downlink signals are sent on a same physical resource using different beams;
receiving, by the network device, first indication information sent by the first terminal device, wherein the first indication information is used to indicate at least one target downlink signal in the plurality of downlink signals, and the at least one target downlink signal comprises one or more downlink signals in the plurality of downlink signals, measurement quality of which is poorer than measurement quality of any downlink signal other than the at least one target downlink signal in the plurality of downlink signals; and
performing, by the network device, downlink scheduling on a second terminal device according to the first indication information,
wherein the method further comprises: receiving, by the network device, the measurement quality of the at least one target downlink signal sent by the first terminal device,
wherein receiving, by the network device, first indication information sent by the first terminal device comprises:
receiving, by the network device, a first uplink signal sent by the first terminal device, the first uplink signal carrying the first indication information, the first uplink signal being an uplink signal corresponding to the at least one target downlink signal, and each downlink signal in the plurality of downlink signals having a correspondence with an uplink signal.

9. A terminal device, comprising:
a memory configured to store a program code; and
a processor configured to call the program code to:
detect a plurality of downlink signals sent by a network device, wherein the plurality of downlink signals are sent on a same physical resource using different beams; and send first indication information to the network device, wherein the first indication information is used to indicate at least one target downlink signal in the plurality of downlink signals, and the at least one target downlink signal comprises one or more downlink signals in the plurality of downlink signals, measurement quality of which is poorer than measurement quality of any downlink signal other than the at least one target downlink signal in the plurality of downlink signals,
wherein the processor is further configured to call the program code to send the measurement quality of the at least one target downlink signal to the network device, and
the processor is further configured to call the program code to send a first uplink signal to the network device, the first uplink signal carrying the first indication information, the first uplink signal being an uplink signal corresponding to the at least one target downlink signal, and each downlink signal in the plurality of downlink signals having a correspondence with an uplink signal.

10. The terminal device of claim 9, wherein the at least one target downlink signal which comprises one or more downlink signals in the plurality of downlink signals, measurement quality of which is poorer than measurement quality of any downlink signal other than the at least one target downlink signal in the plurality of downlink signals comprises:
a first downlink signal in the plurality of downlink signals, the first downlink signal being a downlink signal that is not detected by the terminal device on a transmission resource for the first downlink signal.

11. The terminal device of claim 9, wherein the measurement quality comprises at least one of a detection result, reference signal receiving power (RSRP), reference signal receiving quality (RSRQ), a signal path loss value or a channel quality indicator (CQI) of the downlink signal.

12. The terminal device of claim 9, wherein each downlink signal in the plurality of downlink signals having a correspondence with an uplink signal comprises:
a transmission resource for each downlink signal in the plurality of downlink signals having a correspondence with a transmission resource for the uplink signal corresponding to the downlink signal, or each downlink signal in the plurality of downlink signals having a correspondence with a sequence used in the uplink signal corresponding to the downlink signal.

13. The terminal device of claim 9, wherein the processor is further configured to call the program code to send uplink control information (UCI) to the network device through a physical uplink control channel (PUCCH) or a physical uplink shared channel (PUSCH), the UCI carrying the first indication information.

14. The terminal device of claim 9, wherein the a plurality of downlink signals is at least one: downlink signals sent by the network device using different beams, or downlink signals received by the terminal device using different beams.

15. The terminal device of claim 9, wherein the downlink signal is a channel state information reference signal (CSI-RS), a synchronization signal (SS) or a physical broadcast channel (PBCH).

* * * * *